United States Patent [19]

Mogensen et al.

[11] 4,205,992

[45] Jun. 3, 1980

[54] ALKALI RESISTANT, SYNTHETIC, MINERAL FIBRES

[75] Inventors: Gurli Mogensen, Bjaeverskov; Leif M. Jensen, Roskilde, both of Denmark

[73] Assignee: Rockwool International A/S, Denmark

[21] Appl. No.: 974,005

[22] Filed: Dec. 28, 1978

[30] Foreign Application Priority Data

Jan. 2, 1978 [DK] Denmark .................... 10/78

[51] Int. Cl.² .................... C03C 13/00; C04B 7/02
[52] U.S. Cl. .................... 106/50; 106/99
[58] Field of Search .................... 106/50, 99

[56] References Cited

U.S. PATENT DOCUMENTS

| | | | |
|---|---|---|---|
| 3,929,497 | 12/1975 | Clark-Monks | 106/50 |
| 4,002,482 | 1/1977 | Coenen | 106/99 |
| 4,008,094 | 2/1977 | Beall et al. | 106/99 |

Primary Examiner—James Poer
Attorney, Agent, or Firm—Watson, Cole, Grindle & Watson

[57] ABSTRACT

Alkali resistant, synthetic, mineral fibres having the following composition on weight basis: $SiO_2$: 42–50%, $Al_2O_3$: 8–13%, Iron oxides (calculated as FeO): 6–11%, CaO: 4–11%, MgO: 17–22%, $TiO_2$: 0.5–3% and alkali metal oxides: 0.5–3.5%.

4 Claims, No Drawings

ALKALI RESISTANT, SYNTHETIC, MINERAL FIBRES

BACKGROUND OF THE INVENTION

This invention relates to alkali resistant, synthetic, mineral fibres, and more particularly to mineral fibres useful for the reinforcement of cementitious products.

Cementitious products, such as products made of concrete based on Portland cement or other types of cement or mixtures of cement and other types of binders, exhibit high compression strengths but low tensile strengths.

It is well known that the tensile strengths of cementitious products can be increased by incorporating therein a fibrous reinforcement. Thus, asbestos fibres have found widespread use as a reinforcing material in cement products for use in the building industry.

Unfortunately, the use of asbestos fibres presents serious health problems and, therefore, the use of asbestos fibres has been prohibited in some countries and is likely to be prohibited in other countries.

Many attempts have been made to replace asbestos fibres with synthetic mineral fibres, such as rock wool fibres, slag fibres and glass fibres in fibre reinforced cementitious products.

However, cementitious products reinforced by synthetic mineral fibres do not exhibit fully satisfactory strength properties because the mineral fibres do not have a sufficient resistance to attack by the alkaline components of the cement matrix to prevent the fibres from being partially or wholly decomposed.

According to the accepted German patent application No. 1.796.213 it has been attempted to increase the alkali resistance of glass fibres by coating the fibres with a methyl siloxane and by manufacturing the glass fibres from such starting materials that the fibres produced have a composition falling within the following ranges:

| | | | |
|---|---|---|---|
| $SiO_2$: | 35–47% | by weight | |
| $Al_2O_3$: | 5–18% | by weight | |
| $FeO + Fe_2O_3$: | 2–15% | by weight | |
| CaO: | 2–23% | by weight | |
| MgO: | 1–30% | by weight | |
| $Na_2O + K_2O$: | up to 4% | by weight | |
| $TiO_2$: | up to 10% | by weight | and either |
| $ZrO_2$: | up to 10% | by weight | or |
| ZnO: | up to 5% | by weight | | the sum of CaO and MgO being from 14 to 38% by weight.

SUMMARY OF THE INVENTION

The invention is based on detailed investigations on the influence of various oxides on the tensile strength and alkali resistance of the fibres made from mixtures of such oxides. During these investigations it was found that apart from the tensile strength and alkali resistance of of fibres a further factor, viz. the melt viscosity, has to be taken into consideration in order to provide fibres suitable for commercial production. It was also found that mixtures having high contents of alkaline components did not form melts having a viscosity suitable for fibre production.

Based on comprehensive investigations and computer calculations, it was found that synthetic mineral fibres having high tensile strength and alkali resistance can be produced from melts having a satisfactory viscosity.

Thus, the fibres according to the invention have the following composition:

| | | |
|---|---|---|
| $SiO_2$: | 42–50% | by weight |
| $Al_2O_3$: | 8–13% | — |
| Iron oxides (calculated as FeO) | 6–11% | — |
| CaO: | 4–11% | — |
| MgO: | 17–22% | — |
| $TiO_2$: | 0.5–3% | — |
| $R_2O$: | 0.5–3.5% | — | wherein R is an alkali metal.

Melts having a composition corresponding to the fibre composition set forth above have a viscosity of about 5 poise at about 1500° C. This is a fully satisfactory viscosity since it is well known that the melt viscosity should be from about 5 to about 10 poise at 1500° C. to be suitable for fibre production.

The alkali resistance of the fibres according to the invention was determined by using the accelerated alkali resistance test described by Majumdar, A. J., and Ryder, J. F., "Glass Fibre Reinforcement of Cement Products", Glass Technology, Volume 8, No. 3 (June 1968).

The strength and alkali resistance of fibres according to the invention will appear from the table set forth in the Example.

The invention also relates to cementitious products reinforced by the alkali resistant synthetic mineral fibres described above.

When the synthetic mineral fibres according to the invention are to be used for the reinforcement of cementitious products, such as products based on Portland cement, calcium silicate or similar alkaline binders, the average diameter of the fibres preferably is from 3 to 15 μm. If the average diameter is less than 3 μm, the reduction of strength produced by the alkaline components of the matrix is excessively high. On the other hand, fibres having an average diameter exceeding 15 μm should preferably not be used because the reinforcement per area unit of a cross section of a fibre reinforced product decreases with increasing fibre diameter.

The invention will be described in further detail with reference to the following Example illustrating the manufacture of synthetic mineral fibres of different compositions.

EXAMPLE

Synthetic mineral fibres were produced from the following starting materials: diabase, lime, magnesite, corundum, titanium dioxide and quartz. The mixture of starting materials were molten in a crucible and the melt was converted into fibres with a cascade spinner.

The composition of the fibres thus produced and their properties are set forth in the following Table:

TABLE

| Composition: | $Ro^{(1)}$ | L | HS1 | HS2 | HS3 | FS1 | FS2 | FS3 | FS4 | FS5 | FS6 |
|---|---|---|---|---|---|---|---|---|---|---|---|
| $SiO_2$, % by weight | 47.0 | 47.0 | 46.5 | 47.5 | 43.5 | 48.0 | 48.5 | 48.0 | 48.5 | 48.5 | 49.0 |
| $Al_2O$, % by weight | 13.5 | 9.0 | 10.0 | 12.0 | 12.5 | 11.5 | 11.5 | 11.5 | 12.5 | 9.5 | 9.5 |
| Iron oxides, | | | | | | | | | | | |

TABLE-continued

| Composition: | Ro[1] | L | HS1 | HS2 | HS3 | FS1 | FS2 | FS3 | FS4 | FS5 | FS6 |
|---|---|---|---|---|---|---|---|---|---|---|---|
| as FeO, % by weight | 8.0 | 9.0 | 7.5 | 8.5 | 8.5 | 8.0 | 6.0 | 7.0 | 7.5 | 6.5 | 6.5 |
| CaO, % by weight | 15.5 | 9.5 | 9.5 | 8.0 | 11.0 | 7.5 | 6.5 | 7.0 | 8.5 | 9.0 | 8.5 |
| MgO, % by weight | 10.0 | 22.0 | 19.0 | 17.0 | 19.5 | 19.5 | 20.5 | 20.5 | 17.0 | 20.0 | 19.5 |
| $TiO_2$, % by weight | 2.5 | 2.0 | 2.0 | 1.5 | 1.0 | 1.5 | 2.0 | 1.5 | 2.0 | 2.0 | 2.0 |
| $R_2O$, % by weight | 3.5 | 1.5 | 2.5 | 3.0 | 3.0 | 3.0 | 3.0 | 3.0 | 3.0 | 2.5 | 2.5 |
| Properties: | | | | | | | | | | | |
| Strength, MPa | 900 | 1141 | 860 | 1128 | 701 | 866 | 766 | 768 | 598 | 587 | 539 |
| Alkali resistance[2], % | 25 | 67 | 73 | 56 | 47 | 95 | 70 | 94 | 76 | 84 | 95 |
| Acidity[3] (calculated) | 1.39 | 1.06 | 1.17 | 1.33 | 1.10 | 1.26 | 1.30 | 1.26 | 1.36 | 1.21 | 1.25 |

[1]Ro = Composition of a well known rock wool product.
[2]Measured by the above mentioned accelerated alkali resistance test.
[3]The acidity which reflects the melt viscosity is calculated as the ratio of acid to alkaline components of the mixture of starting materials.

As will appear from the above data, the fibres according to the invention which have essentially the same strength as the well known rock wool fibres exhibit a considerably higher alkali resistance. Further, it should be noted that the acidity which reflects the viscosity of the melt from which the fibres are prepared and which preferably should be within the range 1.05–1.50 is fully acceptable.

We claim:

1. Alkali resistant, synthetic, mineral fibres, having a composition consisting essentially of:

| $SiO_2$: | 42–50% | by weight |
|---|---|---|
| $Al_2O_3$: | 8–13% | — |
| Iron oxides (calculated as FeO) | 6–11% | — |
| CaO: | 4–11% | — |
| MgO: | 17–22% | — |
| $TiO_2$: | 0.5–3% | — |
| $R_2O$: | 0.5–3.5% | — | wherein R is an alkali metal.

2. A fibre reinforced cementitious product which comprises a cementitious matrix and reinforcing fibres therein, said fibre reinforcement comprising alkali resistant, synthetic, mineral fibres having a composition consisting essentially of:

| $SiO_2$ | 42–50% | by weight |
|---|---|---|
| $Al_2O_3$ | 8–13% | — |
| Iron oxides calculated as FeO): | 6–11% | — |
| CaO: | 4–11% | — |
| MgO | 17–22% | — |
| $TiO_2$ | 0.5–3% | — |
| $R_2O$ | 0.5–[3,5] 3.5% | — | wherein R is an alkali metal.

3. A fibre reinforced cementitious product as defined in claim 2, wherein said mineral fibres have an average diameter of between 3 and 15 μm.

4. A fibre reinforced cementitious product as defined in claim 2, wherein said cementitious matrix consists of Portland cement.